(12) United States Patent
Hayashide et al.

(10) Patent No.: US 7,688,529 B2
(45) Date of Patent: Mar. 30, 2010

(54) LENS UNIT AND IMAGE READING APPARATUS USING THE SAME

(75) Inventors: Tadao Hayashide, Utsunomiya (JP); Takayuki Sugiyama, Utsunomiya (JP); Toshio Takahashi, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/849,779

(22) Filed: Sep. 4, 2007

(65) Prior Publication Data
US 2008/0062530 A1 Mar. 13, 2008

(30) Foreign Application Priority Data
Sep. 11, 2006 (JP) ............... 2006-245439

(51) Int. Cl.
*G02B 7/02* (2006.01)
(52) U.S. Cl. ...................... 359/811; 359/668
(58) Field of Classification Search ......... 359/205–207, 359/291, 668–671, 694–701, 811, 819
See application file for complete search history.

(56) References Cited

U.S. PATENT DOCUMENTS

| 5,548,450 | A | 8/1996 | Kang | 359/822 |
|---|---|---|---|---|
| 6,507,444 | B2 | 1/2003 | Hayashide et al. | 359/720 |
| 6,674,584 | B2 * | 1/2004 | Anderson | 359/819 |
| 6,801,375 | B2 | 10/2004 | Hayashide | 359/819 |
| 6,995,927 | B2 * | 2/2006 | Onda | 359/699 |
| 2002/0163739 | A1 | 11/2002 | Hayashide et al. | 359/720 |
| 2003/0214731 | A1 | 11/2003 | Hayashide | 359/819 |
| 2004/0042773 | A1 * | 3/2004 | Uchiyama et al. | 396/6 |
| 2006/0109668 | A1 * | 5/2006 | Schmieder et al. | 362/455 |
| 2006/0132880 | A1 * | 6/2006 | Amada et al. | 359/196 |

FOREIGN PATENT DOCUMENTS

| CN | 1115859 A | 1/1996 |
|---|---|---|
| JP | 2000-171705 | 6/2000 |
| JP | 2004-78149 | 3/2004 |
| JP | 2004-118056 | 4/2004 |

OTHER PUBLICATIONS

Oct. 17, 2008 Chinese Official Action in Chinese Patent Application No. 200710154297 (with translation).

* cited by examiner

*Primary Examiner*—Scott J Sugarman
*Assistant Examiner*—Vipin M Patel
(74) *Attorney, Agent, or Firm*—Fitzpatrick, Cella, Harper & Scinto (57) ABSTRACT

A lens unit and an image reading apparatus configured to hold an anamorphic lens precisely with a simple structure, without a lens spacing error or eccentric error: the lens unit including a barrel member configured to hold at least one rotationally symmetric lens having a rotationally symmetric shape with respect to an optical axis; an anamorphic lens having at least one anamorphic surface circumscribing an end portion of the barrel member; a coaxiality maintaining device configured to engage the anamorphic lens and the barrel member with each other to align central axes of the anamorphic lens and the barrel member with each other, and arranged relatively rotate the anamorphic lens and the barrel member relative to each other with reference to the aligned central axes of them; and an elastic member configured to push the anamorphic lens against the barrel member.

2 Claims, 10 Drawing Sheets

LENS UNIT AND IMAGE READING APPARATUS USING THE SAME

FIELD OF THE INVENTION AND RELATED ART

This invention relates to a lens unit and image reading apparatus using the same. More particularly, the invention concerns an apparatus such as an image scanner, a copying machine or a facsimile machine, for example, in which the optical performance of an imaging optical system having an anamorphic lens is best utilized to perform high-precision image reading.

Figure 7:
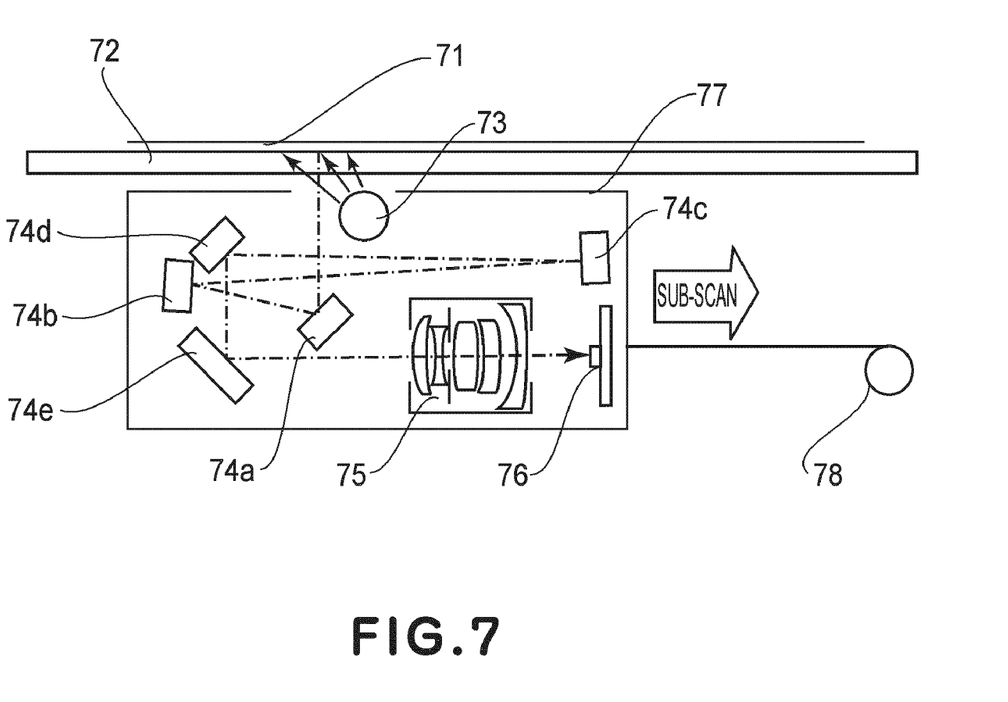
FIG. 7 is schematic diagram of a main portion of the structure of a conventional image reading apparatus.

FIG. 7 is a schematic diagram of a main portion of the structure of a conventional image reading apparatus.

In FIG. 7, denoted at 72 is an original table (original table glass) on which an original 71 is placed. Denoted at 77 is a carriage in which an illumination system 73, reflecting mirrors 74a-74e, an imaging lens (lens unit) 75, and reading means (CCD) 76 to be described later are accommodated integrally.

The carriage 77 is scanningly moved in the direction of an arrow A (sub-scan direction) in the diagram, by means of a sub-scan mechanism 78 such as a motor, whereby imagewise information on the original 71 is read.

The imagewise information of the original 71 read thereby is sent to a personal computer or the like which is an external equipment, through an interface not illustrated.

Denoted at 73 is an illumination system which comprises a xenon tube, halogen lamp or light emitting diode array, for example. It is to be noted that the illumination system 73 may be used in combination with a reflecting plate such as an aluminum-deposited plate, for example. Denoted at 74a-74e are reflecting mirrors which function to bend the light beam from the original 71, inside the carriage 77.

Denoted at 75 is an imaging lens (lens unit) which functions to image the light from the original 71 on the surface of reading means 76 to be described below.

Denoted at 76 is a CCD (Charge Coupled Device) or one-dimensional photoelectric conversion element as reading means, which comprises such a structure that a plurality of picture elements are arrayed along the main-scan direction which is perpendicular to the sheet of the drawing.

In image reading apparatuses having such structure as described above, downsizing of the carriage 77 is indispensable to attempt downsizing of the overall system. And, for this downsizing of the carriage 77, it will be most effectual measures to widen the field angle of the imaging lens 75 to shorten the object-to-image distance thereof to thereby shorten the optical path length itself.

Various proposals have already been made in regard to such an image reading apparatus having a carriage being downsized in the manner described above (see Patent Document No. 1).

In image reading apparatuses of the structure described above, the field angle of the imaging lens can be widened by a method in which an anamorphic lens having an anamorphic surface is used as the imaging lens. In this approach, the imaging performance of the imaging lens becomes rotationally asymmetric with respect to the optical axis. Therefore, it becomes necessary to regulate and match the main-scan direction (meridional direction) of the imaging lens and the array direction of plural picture elements of the CCD with each other.

Furthermore, in the manufacturing process of such imaging lens, if the anamorphic lens is fixed off the reference axis of the lens barrel, a decentering error occurs. Although such decentering error may cause deterioration of the imaging performance, the imaging performance on the CCD surface can still be held well by rotationally adjusting the rotationally symmetric lens group.

Various proposals have been made in regard to such image reading apparatus (see Patent Document No. 2).

The imaging lens described above will now be explained in greater detail with reference to FIG. 8 and FIG. 9.

Figure 8:
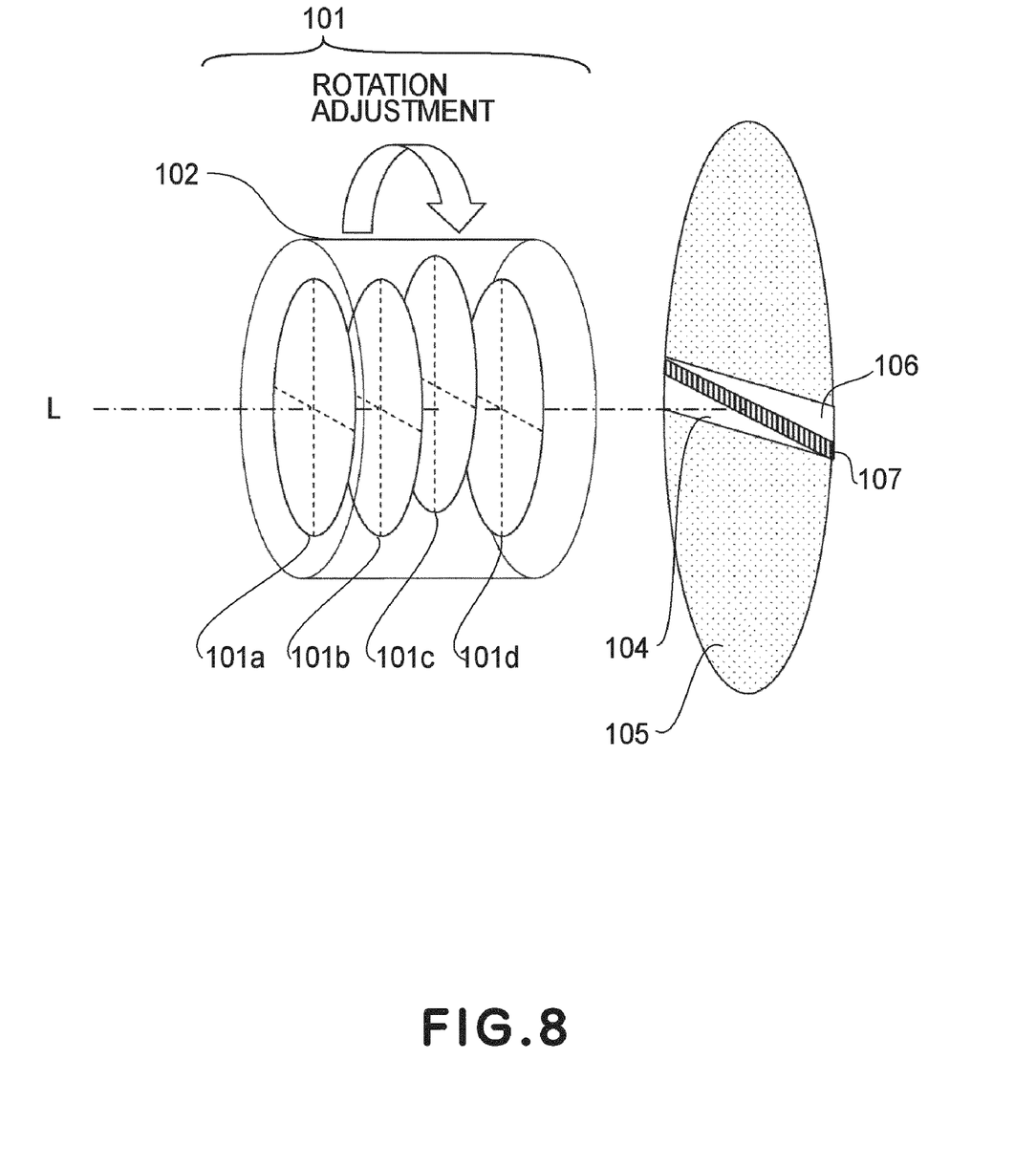
FIG. 8 is a schematic diagram for explaining rotary adjustment of a conventional image reading lens.

First of all, a conventional imaging lens 101 comprised of only rotationally symmetric lenses is illustrated in FIG. 8, and description will be made thereto.

If the rotationally symmetric lenses 101a, 101b, 101c, 101d are produced exactly in accordance with their design, sufficient imaging performance will be obtainable by the whole image-forming region 105 depicted by dot hatching in the diagram. Generally, however, as shown at the rotationally symmetric lens 101c in the diagram, lens decentering occurs during the manufacturing process of the imaging lens. If such lens decentering occurs, the imaging performance over the image plane becomes uneven.

In consideration of this, in the case of imaging lens 101 which is comprised of only lenses of rotationally symmetric shape, the lens is rotated about the optical axis. Furthermore, it is necessary to adjust the lens so that the best imaging region 104 within the imaging region 105 having a highest imaging performance overlaps with the array direction 106 of the picture elements of the one-dimensional photoelectric conversion element 107. Hereinafter, this will be referred to as "rotary adjustment".

Figure 9:
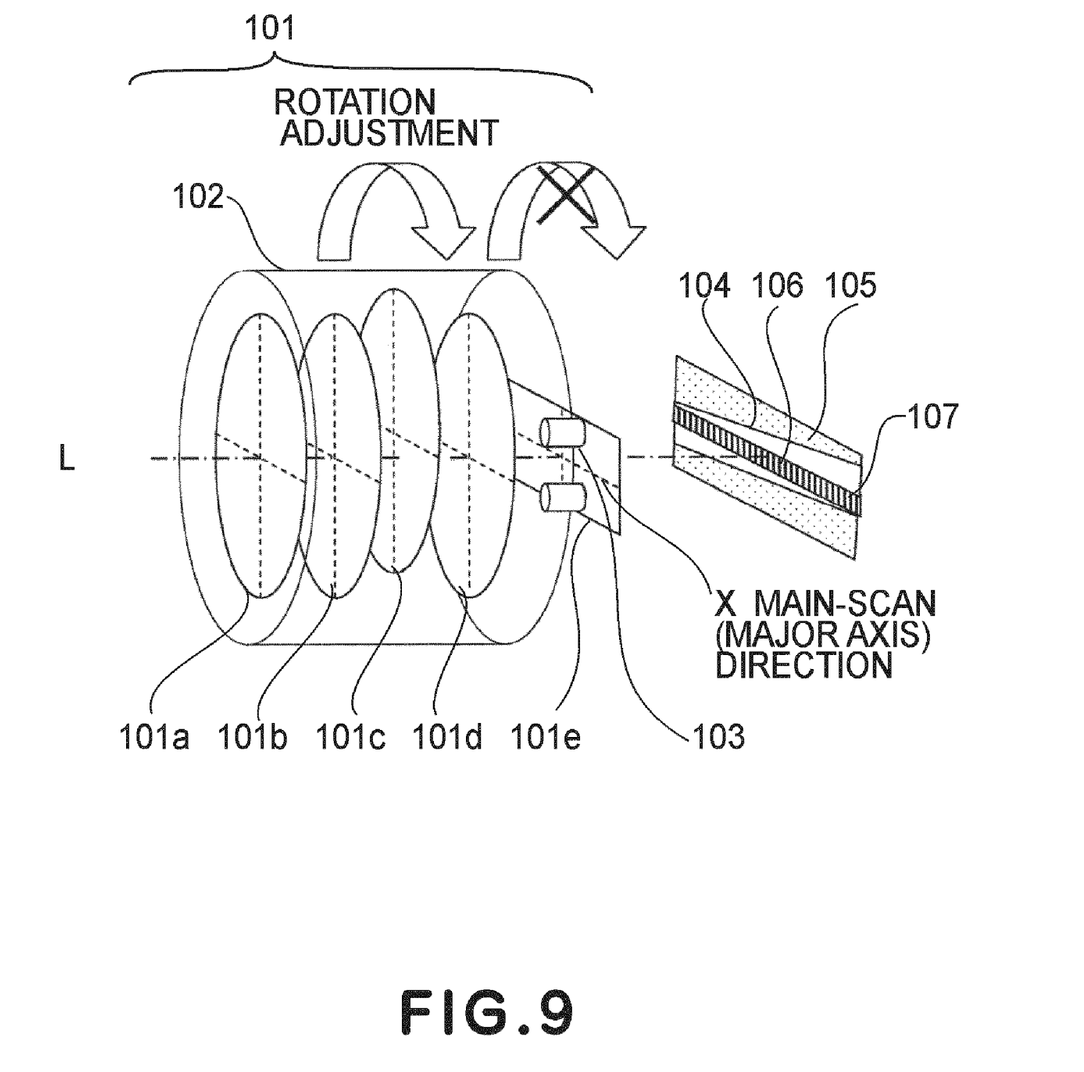
FIG. 9 is a schematic diagram for explaining rotary adjustment of a conventional image reading lens having an anamorphic surface.

Next, an imaging lens 101 comprised by using an anamorphic lens is illustrated in FIG. 9, and description will be made thereto.

Depicted in the diagram circles are lenses (rotationally symmetric lenses) 101a, 101b, 101c and 101d having rotationally symmetric shape. Depicted by a rectangle is an anamorphic lens (rotationally asymmetric lens) 101e. A long broken line x in the rectangle depicts the main-scan direction (longitudinal-axis direction) of the anamorphic lens 101e. The imaging lens 101 using an anamorphic lens 101e has an imaging region 105 which comprises a flat region as determined by this anamorphic lens 101e.

The one-dimensional photoelectric conversion element 107 comprises a line sensor (CCD) in which a plurality of picture elements which are arrayed in a one-dimensional direction (main-scan direction), taking the imagewise information of the original as a one-dimensional image.

The anamorphic lens 101e is positioned so that the main-scan direction (longitudinal-axis direction) corresponding to the one direction of the refracting power thereof coincides with the array direction (main-scan direction) of the plural picture elements of the CCD. The barrel (lens barrel) 102 and the anamorphic lens 101e can be assembled together while being mutually rotated with reference to the optical axis L.

If lens decentering occurs during the manufacturing process as has been explained with respect to the rotationally symmetric lens 101c, rotary adjustment of the barrel 102 is carried out by a rotary adjustment mechanism 103, while keeping fixed the anamorphic lens 101e so that the away direction of the plural picture elements of the CCD is placed at the center of the imaging region 105. Furthermore, adjustment is so made to assure that the best imaging region 104 influenced by the lens decentering overlaps with the array direction 106 of the plural picture elements of the CCD 107. Then, after the adjustment is completed, the lens barrel 102 and the anamorphic lens 101e are joined together by adhesion or the like, into an integral structure.

[Patent Documents]
1. Japanese Laid-Open Patent Application No. 2000-171705
2. Japanese Laid-Open Patent Application No. 2004-078149

In the conventional imaging lens structure described above, the lens barrel that holds rotationally symmetric lenses and the lens barrel that holds a rotational asymmetric lens can be mutually rotationally adjusted relative to each other with reference to the optical axis L, by means of the rotary adjustment mechanism (coaxiality maintaining means) 103. However, the position of them with respect to the optical axis direction cannot be controlled. Therefore, a clearance may be created in some cases between the lens barrel and the rotationally asymmetric lens which must inherently be closely contacted to each other.

The problem will be explained below in more detail, using FIG. 10A-FIG. 10C.

Figure 10A:
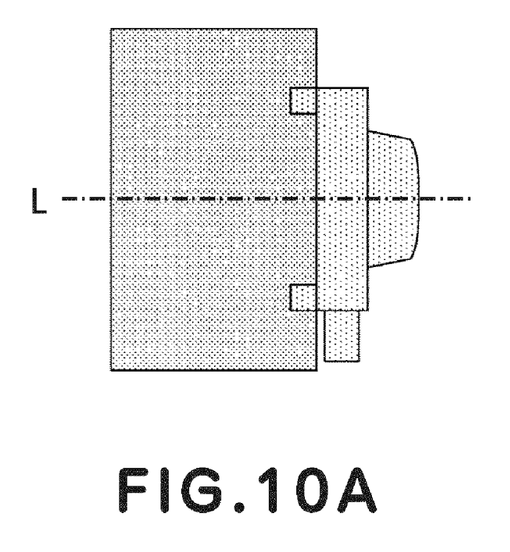
FIG. 10A, FIG. 10B and FIG. 10C are trihedral diagrams showing a conventional lens unit.
Figure 10B:
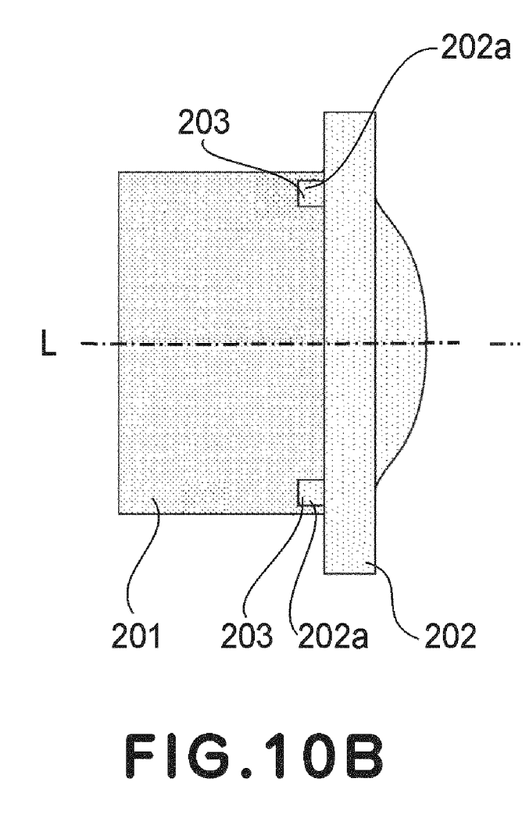
Figure 10C:
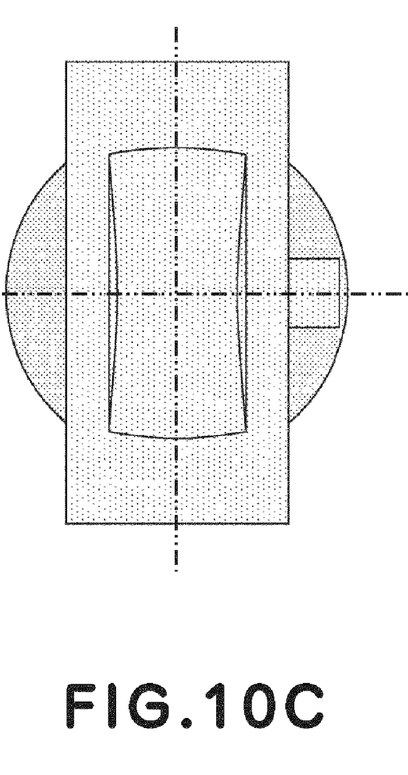

FIG. 10A, FIG. 10B and FIG. 10C are trihedral diagrams illustrating a conventional lens unit (imaging lens). FIG. 10A is a top plan view, FIG. 10B is a side view, and FIG. 10C is a front elevation.

For engagement of the anamorphic lens 202 and the barrel 201 each of which has been formed as an integral structure, the rotary adjustment mechanism (coaxiality maintaining means) of the conventional structure comprises four pins 202a which are provided at the circumference as shown in FIG. 10A-FIG. 10C. The engagement at 203 should provide smooth rotary adjustment and, yet, it shouldn't cause deformation of the lens surface. Therefore, such structure that produces a large stress is unfavorable.

Figure 11A:
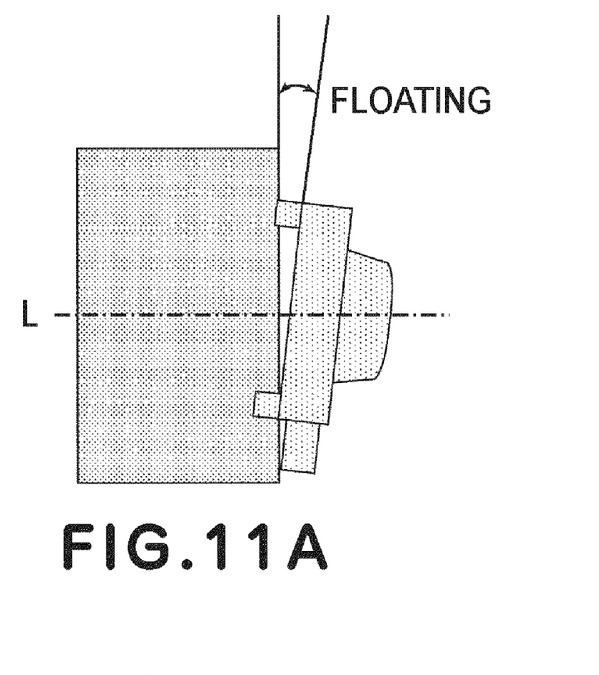
FIG. 11A, FIG. 11B and FIG. 11C are trihedral diagrams for explaining inconveniences in conventional structures.
Figures 11B, 11C:
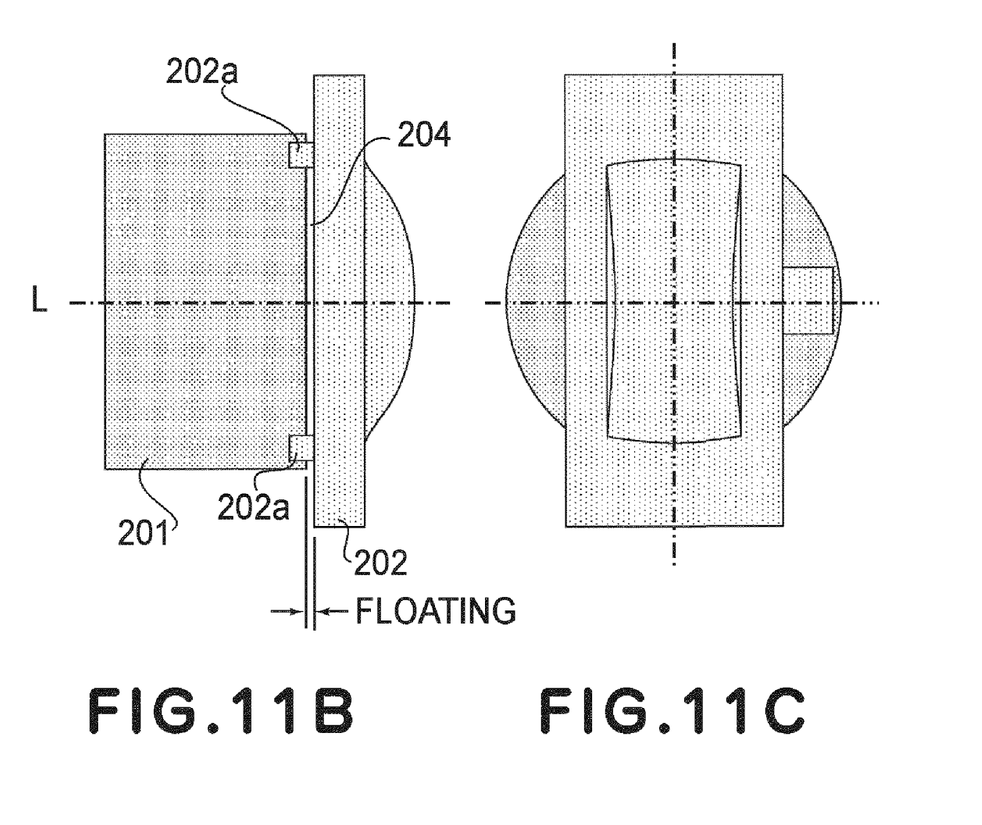

As a result, however, in some cases the anamorphic lens 202 floats as shown in FIG. 11A-FIG. 11C in the optical axis direction, during the rotary adjustment. FIG. 11A, FIG. 11B and FIG. 11C are trihedral diagrams illustrating the lens unit. Like numerals are assigned to similar components corresponding to those of FIG. 10A-FIG. 10C.

If the anamorphic lens 202 floats from the lens barrel 201, not to mention that the optical performance deteriorates due to decentering of the anamorphic lens 202, the lens spacing cannot be kept at the prescribed quantity. Hence, the optical performance is degraded seriously.

Furthermore, during subsequent adhesion operation, a large amount of adhesive agent may flow into the clearance 204. This slows down the performance because the lens surface is deformed by a shrinkage change due to the solidification of the adhesive. Alternatively, additional lens spacing unevenness may be caused by it.

SUMMARY OF THE INVENTION

The present invention provides a lens unit that can hold an anamorphic lens precisely through a simple structure, without a lens spacing error or decentering error, and provides an image reading apparatus having such lens unit.

More specifically, in accordance with an aspect of the present invention, there is provided a lens unit for use in an image reading apparatus arranged to image imagewise information of an original on a photoelectric conversion element for sequential reading of the same, said lens unit comprising: a barrel member configured to hold at least one rotationally symmetric lens having a rotationally symmetric shape with respect to an optical axis; an anamorphic lens having at least one anamorphic surface circumscribing an end portion of said barrel member; coaxiality maintaining means configured to engage said anamorphic lens and said barrel member with each other to align central axes of said anamorphic lens and said barrel member with each other, and arranged relatively rotate said anamorphic lens and said barrel member relative to each other with reference to the aligned central axes of them; and an elastic member configured to push said anamorphic lens against said barrel member.

In one preferred form of this aspect of the present invention, the elastic member has two or three legs to be hooked by a groove formed in an outer peripheral portion of said barrel member.

The anamorphic lens may have an outer configuration of rectangular shape, and wherein, when an axis extending in a lengthwise direction of the rectangular shape and passing through the central axis of the anamorphic lens is referred to as a longitudinal axis while an axis extending in a widthwise direction of the rectangular shape orthogonal to the longitudinal axis and passing through the central axis of the anamorphic lens is referred to as a lateral axis, one of the legs of said elastic member may be disposed at one side of the longitudinal axis while the remaining one or two legs of the elastic member may be disposed at the other side of the longitudinal axis.

The anamorphic lens may be provided with longitudinal-axis direction maintaining means for adjusting parallelism with respect to the longitudinal axis of said anamorphic lens, said longitudinal-axis direction maintaining means is provided at two positions at one side of the longitudinal axis.

In accordance with another aspect of the present invention, there is provided an image reading apparatus, comprising: a lens unit as recited above; and a photoelectric conversion element having a plurality of picture elements arrayed in a one-dimensional direction.

In accordance with the present invention, the rotary adjustment can be carried out while the lens barrel member and the anamorphic lens are kept in close contact with each other. Hence, with the present invention, a lens unit as well as an image reading apparatus that can hold the anamorphic lens precisely through a simple structure, without a lens spacing error or decentering error, can be achieved.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1A:
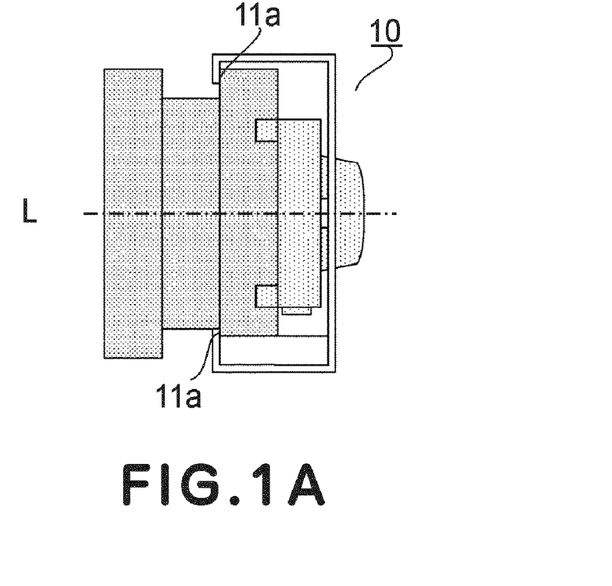
FIG. 1A, FIG. 1B and FIG. 1C are trihedral diagrams showing a lens unit according to a first embodiment of the present invention.
Figures 1B, 1C:
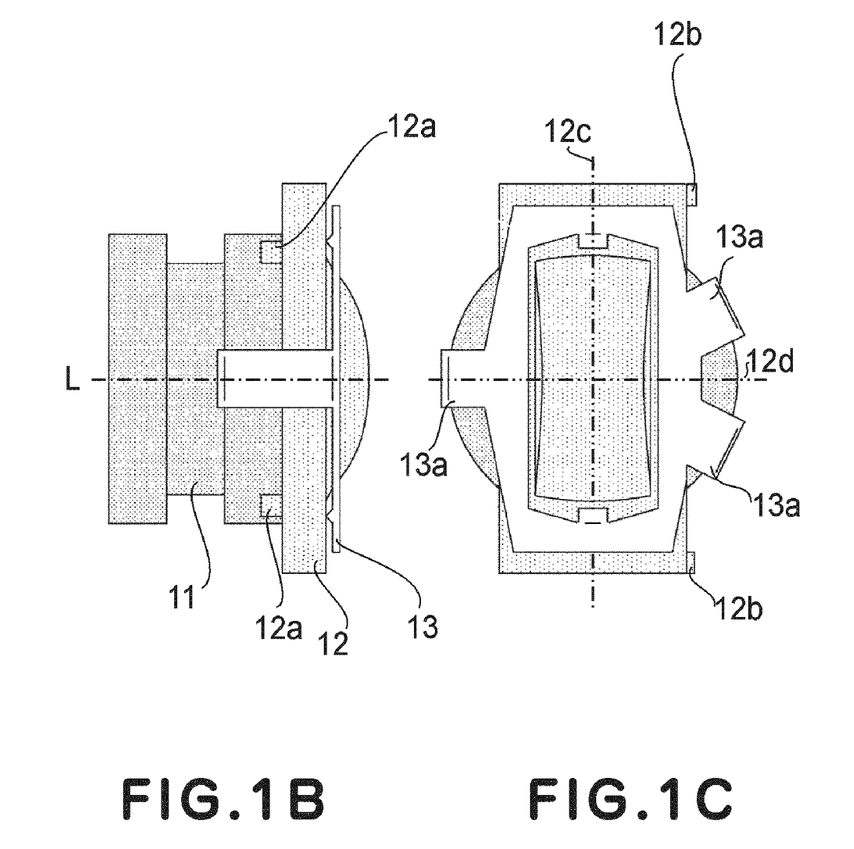

FIG. 1A-FIG. 1C are trihedral diagrams showing a lens unit according to a first embodiment of the present invention. FIG. 1A is a top plan view, FIG. 1B is a side view, and FIG. 1C is a front elevation.

Denoted in FIG. 1A-FIG. 1C at 10 is a lens unit (imaging lens) to be used in an image reading apparatus wherein image-wise information of an original is imaged on a photoelectric conversion element and is read sequentially. Denoted at 11 is a barrel member (lens barrel) having a cylindrical shape at the outer periphery thereof. It serves to hold at least one rotationally symmetric lens having a rotationally symmetric shape with respect to the optical axis L.

Denoted at 12 is an anamorphic lens, at least one surface of which is defined by an anamorphic surface. The anamorphic lens is held by the barrel 11, while circumscribing one end portion of the barrel. The anamorphic lens 12 of the present embodiment has an outer configuration of rectangular shape. Here, of the dimensions of the rectangular shape, an axis extending in the lengthwise direction of the rectangle and passing through the central axis (optical axis) of the anamorphic lens is taken as a longitudinal axis 12c. An axis extending in the widthwise direction of the rectangle which is perpendicular to the longitudinal axis 12c and passing through the central axis of the lens is taken as a lateral axis.

Denoted at 12a are pins as coaxiality maintaining means which function to engage the anamorphic lens 12 and the barrel member 11 with each other and to align their central axes with each other. The pins 12a further function to allow relative rotation of the anamorphic lens and the barrel relative to each other, for rotary adjustment, with reference to their central axes aligned together. In the present embodiment, four pins 12a are used.

Denoted at 13 is an elastic member which functions to push the anamorphic lens 12 against the barrel member 11 along the optical axis direction. The elastic member 13 of the present embodiment is configured to push the barrel member 11 and the anamorphic lens 12, separately from each other.

Denoted at 13a are legs (branches) of the elastic member 13 which are configured to be hooked at the groove 11a formed in the outer peripheral portion of the barrel member 11. The elastic member 13 has three legs 13a.

In the present embodiment, one of these three legs 13a is placed at one side of the longitudinal axis 12c of the anamorphic lens 12, while the remaining two legs are located at the other side of the longitudinal axis 12c. The legs 12a are configured to be hooked by the groove 11a of the barrel member 11.

Denoted at 12b is longitudinal-axis direction maintaining means provided at two points on one side of the longitudinal axis 12c of the anamorphic lens 12, and these longitudinal-axis direction maintaining means function to adjust the parallelism with respect to the longitudinal axis 12c. In this embodiment, with use of the longitudinal-axis direction maintaining means 12b, the array direction of a plurality of picture elements of the photoelectric conversion element (CCD) and the meridional direction (main-scan direction) of the anamorphic lens 12 of the image reading apparatus described below are aligned with each other, to be described later.

Denoted at L is the optical axis of the imaging optical system. In this embodiment, the anamorphic lens 12 is restricted with respect to the optical axis L direction by the elastic member 13 as described above, to assure that the barrel member 11 and the anamorphic lens 12 are closely contacted with each other to avoid formation of a clearance between them.

More specifically, in this embodiment, by engagement of the three legs 13a of the elastic member 13 with the groove 11a provided at the outer peripheral portion of the barrel member 11, the anamorphic lens 12 is so restricted that no clearance is created between the anamorphic lens 12 and the barrel member 11. Based on this, in this embodiment, the rotary adjustment can be performed while keeping the barrel member 11 and the anamorphic lens 12 in close contact with each other and, therefore, the anamorphic lens can be held precisely through a simple structure, without a lens spacing error or eccentric error.

Although the elastic member 13 in the present embodiment may be made of any materials, it can be easily produced by press-machining a metal thin plate, as an example. The elastic force of such thin plate can be controlled easily by changing the plate thickness.

Based on this, the force to be applied to the anamorphic lens 12 can be corrected and deformation of the lens surface is avoided.

When the anamorphic lens 12 is fixed to the barrel member 11, the tilt error worsens in inverse proportion to the length of the lens. Therefore, the lateral-axis direction 12d of the anamorphic lens 12 has to be fixed very precisely. In the present embodiment, the legs 13a are provided at both sides along the lateral-axis direction 12d of the anamorphic lens (i.e., at opposite sides across the longitudinal axis 12c). With this arrangement, the barrel member 11 and anamorphic lens 12 can be fixed very precisely. As a result, the stress to be applied to both of them is well stabilized. Furthermore, based on this, the rotary adjustment can be performed while keeping the barrel member 11 and the anamorphic lens 12 in close contact with each other and, hence, a lens spacing error or eccentric error is avoided.

The measures described above are effective particularly when the anamorphic lens 12 is fixed to the barrel member 11.

As described above, in this embodiment, the anamorphic lens 12 is pushed against the barrel member 11 by the elastic member 13 as described above. Based on this, the rotary adjustment can be performed while keeping the barrel member 11 and the anamorphic lens 12 in close contact with each other and, therefore, a lens spacing error or eccentric error is avoided.

Furthermore, the stress to be produced can be easily controlled by using an elastic member 13 which is separate from the barrel member 11 and the anamorphic lens 12, as described above. Based on this, deformation of the anamorphic lens surface is minimized.

Furthermore, in this embodiment as described above, the elastic member 13 is so configured that three legs 13a (two legs in Embodiments 2 and 3 to be described later) are hooked by the groove 11a provided at the outer peripheral portion of the barrel member 11. This makes the structure of the elastic member 13 very simple.

Here, if there is only one leg 13a, the stress applied to the anamorphic lens 12 becomes unstable and it causes decentering. If four or more legs 13a are used, the structure becomes complicated and variation in length of the legs may result easily. Furthermore, the stress to the anamorphic lens 12 as well becomes unstable due to this variation, and again it leads to decentering.

Furthermore, in this embodiment, the longitudinal-axis direction maintaining means 12b for adjusting the parallelism with respect to the longitudinal axis 12c of the anamorphic lens 12 are provided at two points on one side of the longitudinal axis 12c. Based on this, the meridional direction of the anamorphic lens 12 and the array direction of plural picture elements of the photoelectric conversion element can be aligned with each other, by a simple structure.

It is to be noted that the structure of the present embodiment described hereinbefore can be applied even to a lens not having an anamorphic surface, provided that the outer configuration has a rotationally asymmetric shape, as of a so-called flat lens.

[Image Reading Apparatus]

Figure 2:
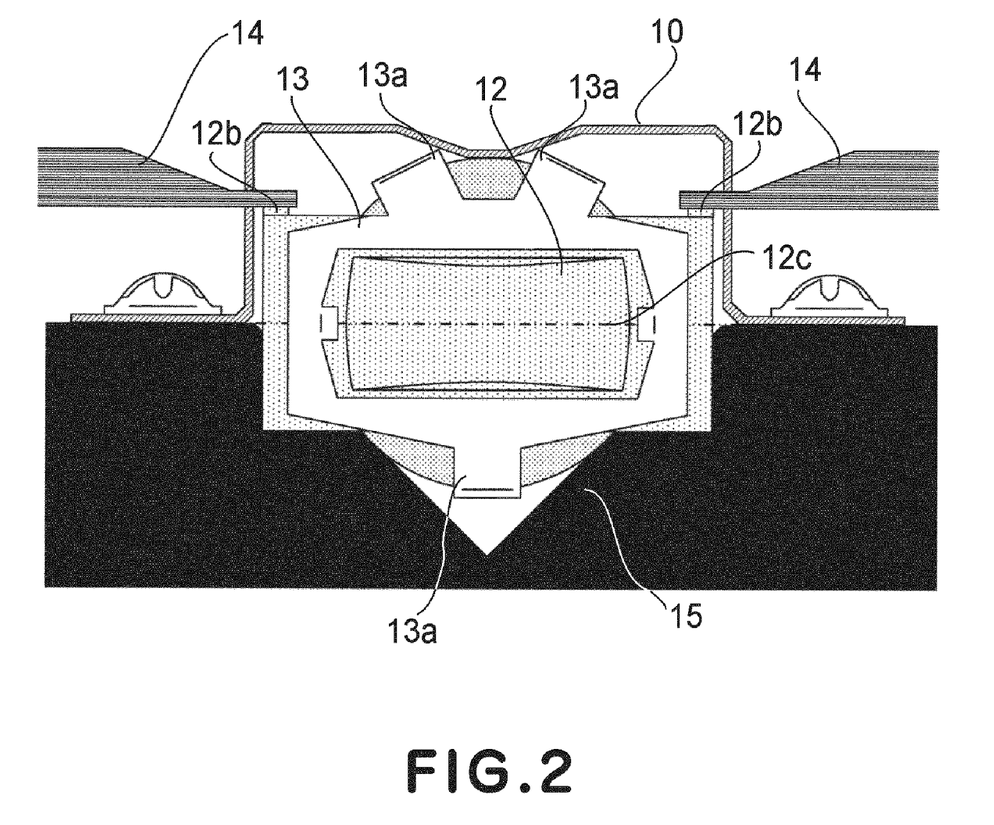
FIG. 2 is a schematic diagram of a main portion of an image reading apparatus into which a lens unit of the present invention is incorporated.

FIG. 2 is a schematic diagram of a main portion of an image reading apparatus into which a lens unit 10 shown in FIG. 1 is incorporated. In FIG. 2, like numerals are assigned to similar components corresponding to those of FIG. 1.

In FIG. 2, there are three legs 13a of the elastic member 13 which are disposed on the opposite sides across the longitudinal axis 12c, one is at one side and two are at the other side. Hence, even though one leg 13a is fixed downward to a lens fixing member 15 having a V-shape as shown in FIG. 2, the lens can be well held thereby without interference of the elastic member 13 with the lens fixing member 15.

The image reading apparatus of the present embodiment is provided with aligning means 14 at two points on the left-hand and right-hand sides of the lens unit 10 as viewed in the drawing. This aligning means 14 is configured to contact with the longitudinal-axis direction maintaining means 12b provided at two points on one side of the longitudinal axis 12c of the anamorphic lens 12, thereby to align the array direction of plural picture elements of the one-dimensional photoelectric conversion element (not shown) and the longitudinal direction (meridional direction) 12c of the anamorphic lens 12 with each other. Based on this, sharp imagewise information can be obtained in the present embodiment.

In image reading apparatuses using a one-dimensional photoelectric conversion element (CCD), the lens field angle has a large influence on the array direction of the element. Therefore, the right-ray passing region of each lens surface has a rectangular shape, being elongated in the element array direction and being short in the direction orthogonal thereto.

This is also the case with the anamorphic lens, and the effective light-ray portion has a rectangular shape. Since the anamorphic lens requires a special aspherical-surface forming process, in the point of manufacture it is not preferable to unnecessarily widen the surface to be processed. Thus, the lens itself would have a rectangular shape being elongated in the longitudinal-axis direction.

When such anamorphic lens 12 is fixed to the barrel member 11, the stress can be stabilized by fixing both sides of the anamorphic lens in the lateral-axis direction 12d (opposite sides across the longitudinal axis) by means of the legs 13a as described above.

If on the other hand the legs 13a are provided at opposite sides across the lateral axis 12d, they should be disposed outwardly of the longitudinal-axis ends, and it causes enlargement of the whole size of the lens. Such inconvenience can be avoided in the present embodiment.

Furthermore, when the lens is fixed to the image reading apparatus in which the lens fixing member 15 has a V-groove shape, the elastic member 13 does not interfere with the V-groove. Hence, the need for a special structure is eliminated.

Embodiment 2

Figure 3A:
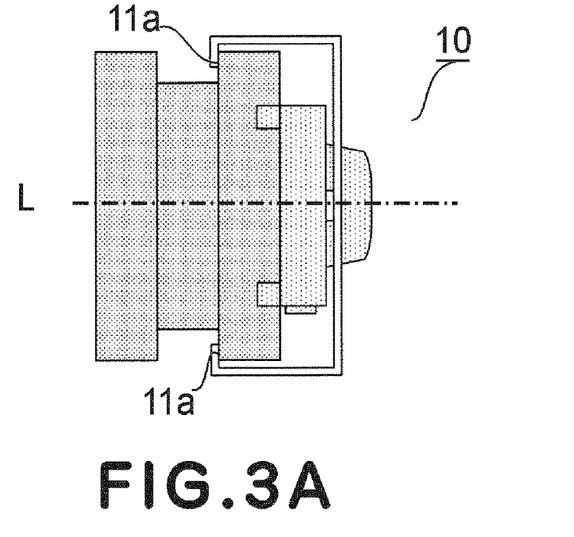
FIG. 3A, FIG. 3B and FIG. 3C are trihedral diagrams showing a lens unit according to a second embodiment of the present invention.
Figures 3B, 3C:
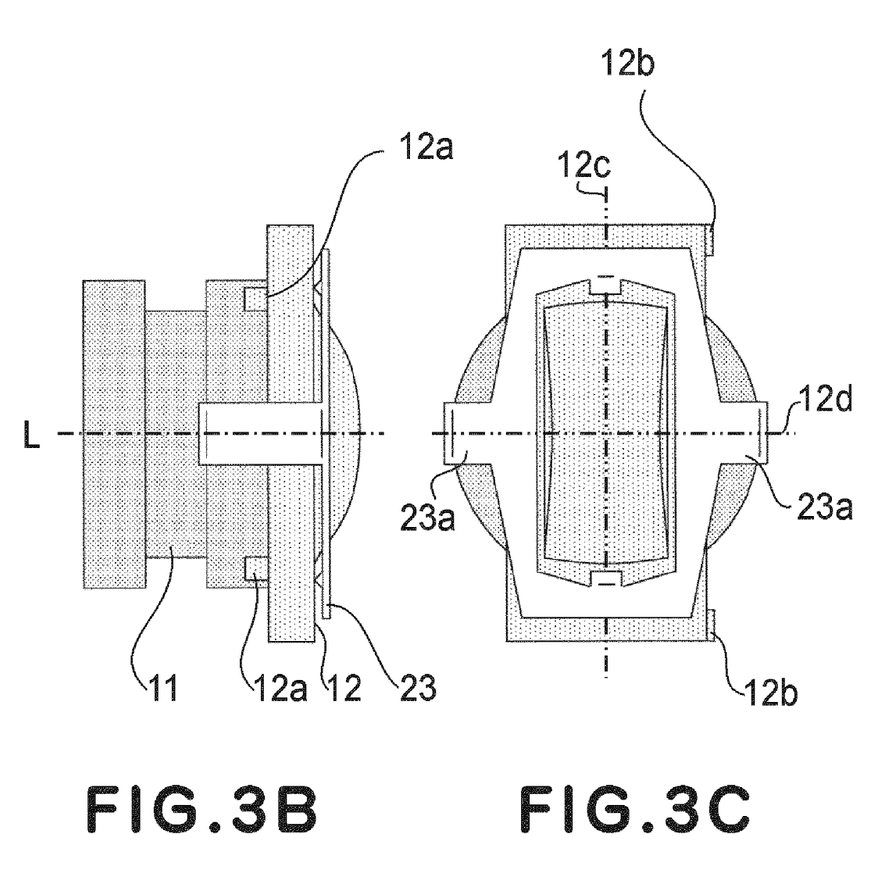

FIG. 3A, FIG. 3B and FIG. 3C are trihedral diagrams illustrating a lens unit according to a second embodiment of the present invention. In FIG. 3A-FIG. 3C, like numerals are assigned to similar components corresponding to those of FIG. 1.

The present embodiment differs from the first embodiment described hereinbefore in that the number of legs 23a of the elastic member 23 is two in the present embodiment. Other structures and the optical function are similar to the first embodiment, and similar advantageous effects are obtained likewise in the present embodiment.

Denoted in the drawings at 23 is an elastic member which functions to push the anamorphic lens 12 against the barrel member 11 along the optical axis direction. Denoted at 23a are legs (branches) of the elastic member 33 which are configured to be hooked at the groove 11a formed in the outer peripheral portion of the barrel member 11. The elastic member 23 has two legs 23a.

In the present embodiment, one of these two legs 23a is placed at one side of the longitudinal axis 12c while the remaining one leg is located at the other side of the longitudinal axis 12c. These legs are configured to be hooked by the groove 11a of the barrel 11.

In this embodiment, the anamorphic lens 12 is pushed against the barrel member 11 by the elastic member 23, like in the first embodiment. Based on this, the rotary adjustment can be performed while keeping the barrel member 11 and the anamorphic lens 12 in close contact with each other and, therefore, a lens spacing error or eccentric error is avoided.

Furthermore, in the present embodiment as well, the stress to be produced can be controlled easily by using the elastic member 23 which is separate from the barrel member 11 and the anamorphic lens 12. Based on this, deformation of the anamorphic lens surface can be minimized.

Furthermore, when the anamorphic lens 12 is fixed to the barrel member 11, legs 23a provided at both sides along the lateral-axis direction 12d (at the opposite sides across the longitudinal axis) likewise the abovementioned first embodiment are used. Based on this, the barrel member 11 and the anamorphic lens 12 can be fixed very precisely, and hence the stress is well stabilized.

Furthermore, based on this, the rotary adjustment can be performed while keeping the barrel member 11 and the anamorphic lens 12 in close contact with each other. Hence, a lens spacing error or eccentric error is avoided.

In the present embodiment as well, like the abovementioned first embodiment, when the lens unit 10 is incorporated into an image reading apparatus, sharp imagewise information can be obtained.

Embodiment 3

Figure 4A:
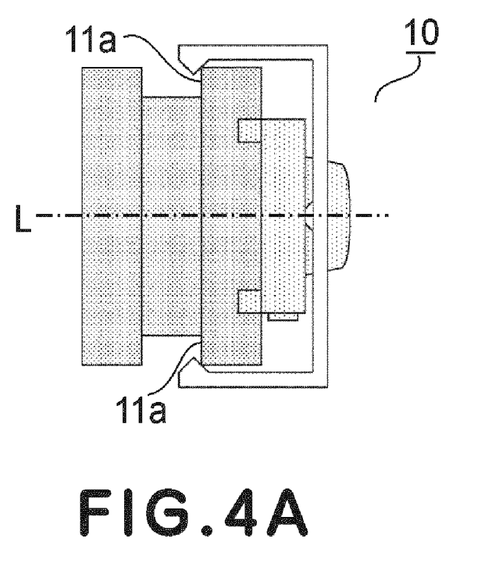
FIG. 4A, FIG. 4B and FIG. 4C are trihedral diagrams showing a lens unit according to a third embodiment of the present invention.
Figures 4B, 4C:
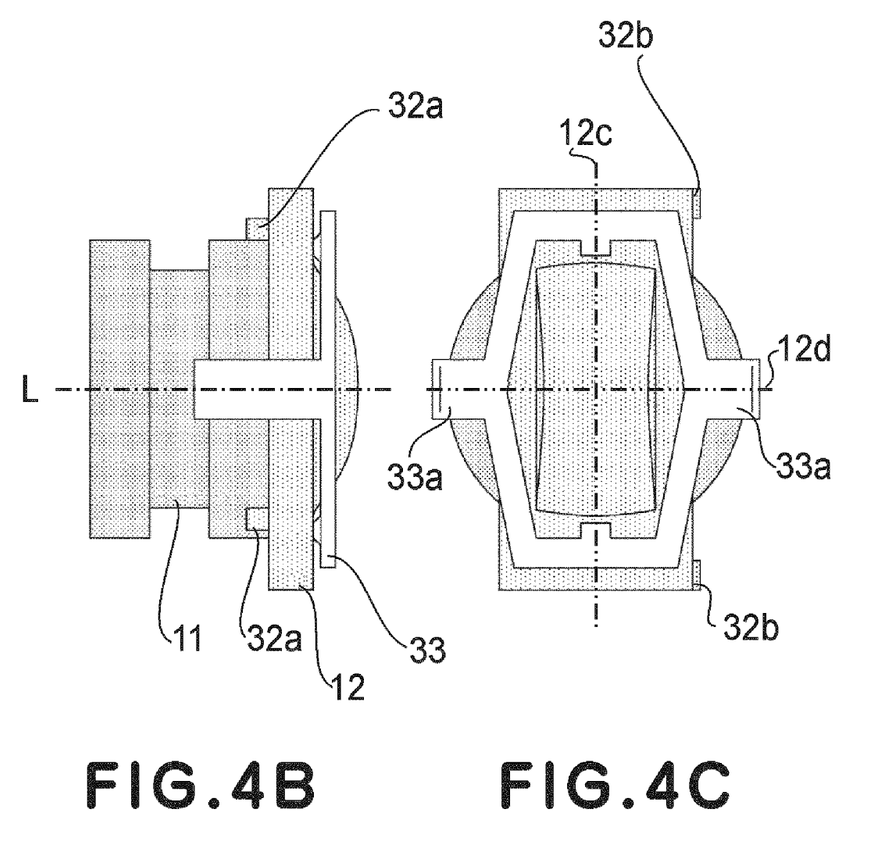

FIG. 4A, FIG. 4B and FIG. 4C are trihedral diagrams illustrating a lens unit according to a third embodiment of the present invention. In FIG. 4A-FIG. 4C, like numerals are assigned to similar components corresponding to those of FIG. 1.

The present embodiment differs from the abovementioned second embodiment in that three pins 32a are used as the coaxiality maintaining means in the present embodiment. Other structures and the optical function are similar to the second embodiment, and similar advantageous effects are obtained likewise.

Denoted in the drawings at 32a are pins as the coaxiality maintaining means which function to engage the anamorphic lens 12 and the barrel member 11 with each other and to align their central axes with each other. Further, it functions to allow relatively rotation of the lens and the barrel relative to each other, for rotary adjustment with reference to their central axes aligned. The present embodiment uses three pins 32a.

Denoted in the drawings at 33 is an elastic member which functions to push the anamorphic lens 12 against the barrel member 11 along the optical axis direction. Denoted at 33a are legs (branches) of the elastic member 33 which are configured to be hooked at the groove 11a formed in the outer peripheral portion of the barrel member 11. The elastic member 33 has two legs 33a.

In the present embodiment, one of these two legs 33a is placed at one side of the major axis 12c, while the other leg is located at the other side of the major axis 12c. These legs are configured to be hooked by the groove 11a of the barrel 11.

It is to be noted that the elastic member 33 of the present embodiment may be made of any materials, but it can be easily produced if an injection-molded article of synthetic resin is used. For the synthetic resin, the elastic force can be changed easily by changing the type of material. Therefore, the force to be applied to the anamorphic lens can be corrected easily, and deformation of the lens surface can be prevented.

In this embodiment, the anamorphic lens 12 is pushed against the barrel member 11 by the elastic member 33, like in the aforementioned second embodiment. Based on this, the rotary adjustment can be performed while keeping the barrel member 11 and the anamorphic lens 12 in close contact with each other and, therefore, a lens spacing error or eccentric error is avoided.

Furthermore, in the present embodiment as well, the stress to be produced can be controlled easily by using the elastic member 33 which is separate from the barrel member 11 and the anamorphic lens 12. Based on this, deformation of the anamorphic lens surface can be minimized.

Furthermore, when the anamorphic lens 12 is fixed to the barrel member 11, legs 33a provided at both sides along the lateral-axis direction 12d (at the opposite sides across the longitudinal axis) like in the abovementioned second embodiment are used. Based on this, the barrel member 11 and the anamorphic lens 12 can be fixed very precisely, and hence the stress is well stabilized.

Furthermore, based on this, the rotary adjustment can be performed while keeping the barrel member 11 and the anamorphic lens 12 in close contact with each other. Hence, a lens spacing error or eccentric error is avoided.

In the present embodiment as well, like the abovementioned second embodiment, when the lens unit 10 is incorporated into an image reading apparatus, sharp imagewise information can be obtained.

[Flatbed Type Image Reading Apparatus]

Figure 5:
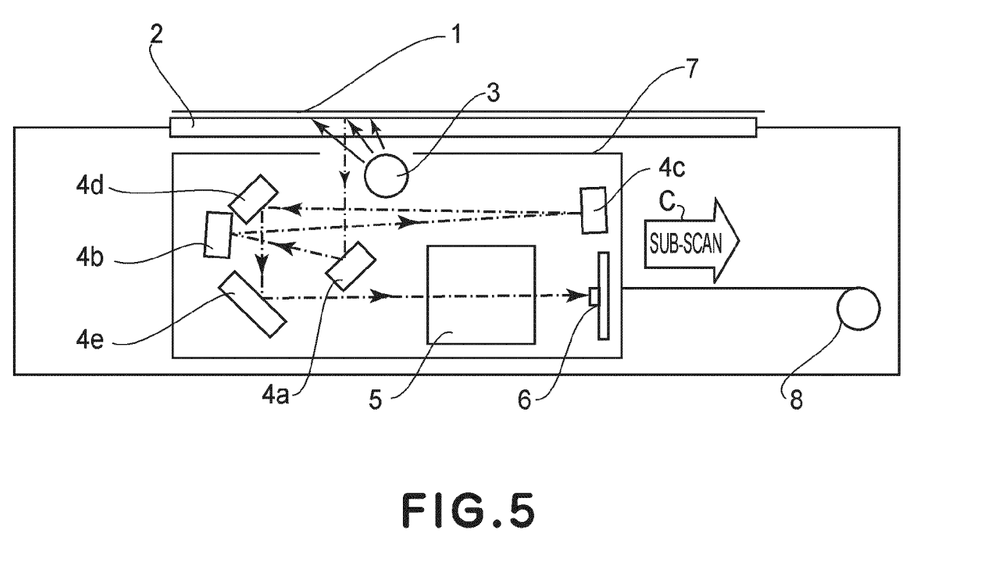
FIG. 5 is a schematic diagram of a main portion of an image reading apparatus into which a lens unit of the present invention is incorporated.

FIG. 5 is schematic diagram of a main portion of a carriage-integrated type (flatbed type) image reading apparatus such as a digital copying machine, for example, into which a lens unit (imaging optical system) according to any one of the first to third embodiments of the present invention is incorporated.

In the present embodiment, a light beam from an illumination system 3 illuminates an original 1 directly or by way of a reflector (not shown). Reflected light from the illuminated original 1 is reflected by first, second, third, fourth and fifth reflection mirrors 4a, 4b, 4c, 4d and 4e, and the light path of the light beam is bent inside the carriage 7.

The light beam thus deflected is imaged upon the surface of a CCD as reading means, by a lens unit 5 according to any one of the first to third embodiments described hereinbefore. The imagewise information of the original 1 is read by moving the carriage 7 in the direction of an arrow C (sub-scan direction) by means of a sub-scan mechanism 8. The thus read imagewise information is sent to a personal computer or the like which is an external equipment, through an interface (not shown).

It is to be noted that the present invention is not limited to such an integral type (flatbed type) image reading apparatus. The invention can be applied to an image reading apparatus having a 1:2 scan optical system such as shown in FIG. 6, for example, essentially in the same manner as has been described above.

Figure 6:
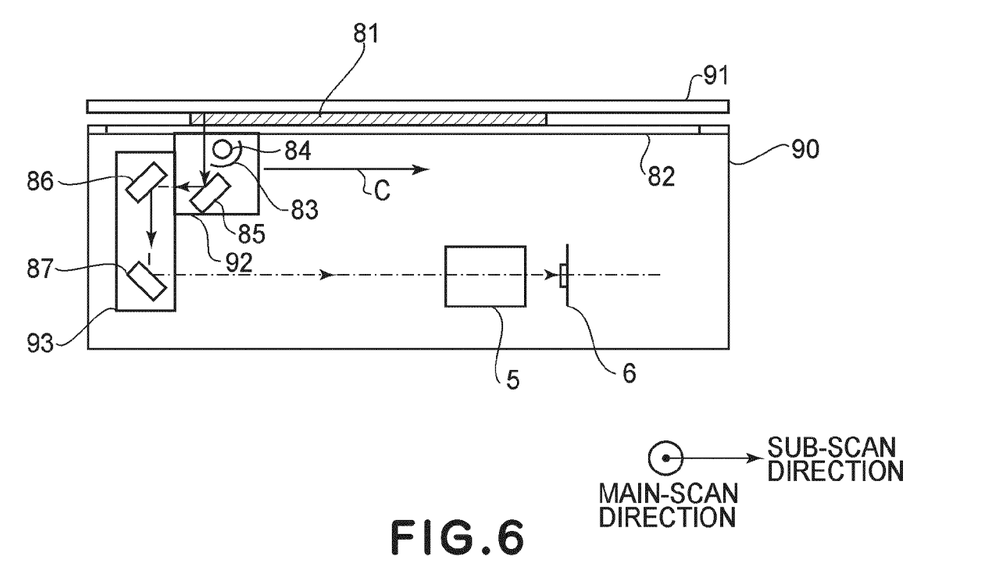
FIG. 6 is a schematic diagram of a main portion of an image reading apparatus into which a lens unit of the present invention is incorporated.

More specifically, in FIG. 6, denoted at 82 is an original table glass, and an original 81 is put on the surface thereof. Denoted at 84 is an illumination light which comprises a halogen lamp, a fluorescent lamp or a xenon lamp, for example. Denoted at 83 is a reflector which functions to reflect the light beam from the illumination light source 84 to illuminate the original efficiently. Denoted at 85, 86 and 87 are first, second and third reflecting mirrors, in this order, which function to bend the light path of the light beam from the original 81, inside the main frame.

Denoted at 5 is a lens unit (imaging optical system) according to any one of the first to third embodiments 1-3, and it functions to image the light beam based on the imagewise information of original 81, on the surface of a photoelectric conversion element. Denoted at 6 is a line sensor (CCD) as the photoelectric conversion element. Denoted at 90 is the main frame, and denoted at 91 is a platen. Denoted at 92 is a first mirror table, and denoted at 93 is a second mirror table.

In FIG. 6, a light beam from an illumination system 84 illuminates an original 81 directly or by way of a reflector 83. Reflected light from the illuminated original 81 is reflected by first, second and third reflection mirrors 85, 86 and 87, and the light path of the light beam is bent inside the main frame 90.

Here, electric scan along the main-scan direction is carried out while the first, second, and third reflecting mirrors 85, 86 and 87 move in the sub-scan direction, by which imagewise information of the original 81 is read. The movement amount of the second and third reflection mirrors 86 and 87 is a half of the movement amount of the first reflecting mirror 85. By this, the distance between the original 81 and the CCD 6 is kept constant.

Although in this embodiment the imaging optical system of the present invention is incorporated into an image reading apparatus for a digital color copying machine, the present invention is not limited to this. The present invention is applicable also to various color image reading apparatuses such as a color image scanner, for example.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2006-245439 filed Sep. 11, 2006, which is hereby incorporated by reference.

What is claimed is:

1. An image reading apparatus, comprising:

a photoelectric conversion element having a plurality of picture elements arrayed in a one-dimensional direction;

a lens unit arranged to image imagewise information of an original on said photoelectric conversion element for sequential reading of the same, said lens unit including (i) a barrel member configured to hold at least one rotationally symmetric lens having a rotationally symmetric shape with respect to an optical axis, (ii) an anamorphic lens having at least one anamorphic surface circumscribing an end portion of said barrel member, (iii) coaxiality maintaining means configured to cause said anamorphic lens and said barrel member to engage with each other so that central axes of said anamorphic lens and said barrel member are aligned with each other, said coaxiality maintaining means further being arranged to relatively rotate said anamorphic lens and said barrel member relative to each other with reference to their aligned central axes, and (iv) an elastic member configured to push said anamorphic lens against said barrel member; and a lens fixing member configured to mount said lens unit thereon and to fix the same, wherein said elastic member has two or three legs to be hooked by a groove formed in an outer peripheral portion of said barrel member, wherein said anamorphic lens has an outer configuration of rectangular shape, wherein, when an axis extending in a lengthwise direction of the rectangular shape and passing through the central axis of said anamorphic lens is referred to as a longitudinal axis while an axis extending in a widthwise direction of the rectangular shape orthogonal to the longitudinal axis and passing through the central axis of said anamorphic lens is referred to as a lateral axis, a first one of the legs of said elastic member is disposed at one side of the longitudinal axis while the remaining one or two legs of said elastic member are disposed at the other side of the longitudinal axis, and wherein said lens unit is fixed so that the first one of said legs is disposed at the lens fixing member side of said lens unit.

2. An image reading apparatus according to claim 1, wherein said lens fixing member has a V-shaped groove, and wherein said lens unit is mounted on said lens fixing member so that one of said legs is positioned in said groove.

* * * * *